April 21, 1942.     R. W. BROWN     2,280,568

WHEEL

Filed July 11, 1940

INVENTOR
Ray W. Brown
BY Evans + McCoy
ATTORNEYS

Patented Apr. 21, 1942

2,280,568

UNITED STATES PATENT OFFICE 2,280,568

WHEEL

Ray W. Brown, Akron, Ohio, assignor to The General Tire & Rubber Company, Akron, Ohio, a corporation of Ohio Application July 11, 1940, Serial No. 344,935

4 Claims. (Cl. 301—63)

This invention relates to pneumatic or cushion tired wheels, and more particularly to small wheels such as the tail skid wheels for aircraft.

It is the purpose of this invention to provide a wheel body of rugged and durable construction which can be manufactured at low cost.

A further object of the invention is to so construct the tire seating portion of the wheel as to provide effective resistance to slippage of the tire on its seat.

A further object is to provide a wheel body so constructed that it provides a reservoir which, when packed with grease, will provide lubrication for the wheel bearings for the life of the wheel.

Further objects are to provide a wheel body composed of identically constructed interchangeable halves and to provide a wheel body which has a transversely disposed chamber adjacent the tire seat which is of a size to receive a laterally projecting valve stem which has its opposite ends near the outer surfaces of the side walls of the wheel body, so that by cutting an opening in a side wall in the end of the recess a pneumatic tire may be mounted upon the wheel body with its valve stem projecting to a side face of the wheel body.

With the above and other objects in view the invention may be said to comprise the wheel as illustrated in the accompanying drawing hereinafter described and particularly set forth in the appended claims, together with such variations and modifications thereof as will be apparent to one skilled in the art to which the invention pertains. Reference should be had to the accompanying drawing forming a part of this specification, in which:

Figure 1:
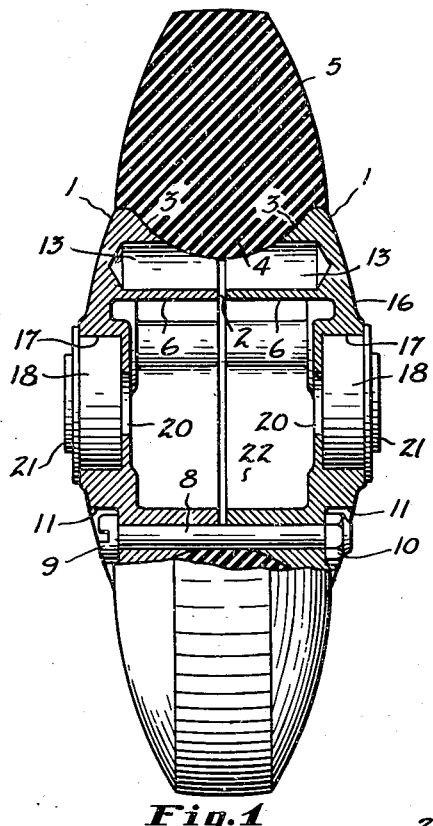
Figure 1 is an axial section through a wheel embodying the invention, showing a cushion tire mounted on the wheel body.
Figure 2:
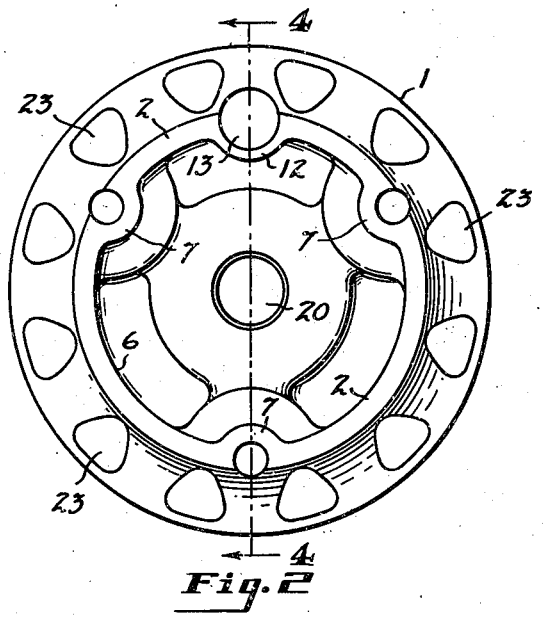
Fig. 2 is a plan view, on an enlarged scale, of one of the two identical halves of the wheel body looking toward the inner side thereof.
Figure 5:
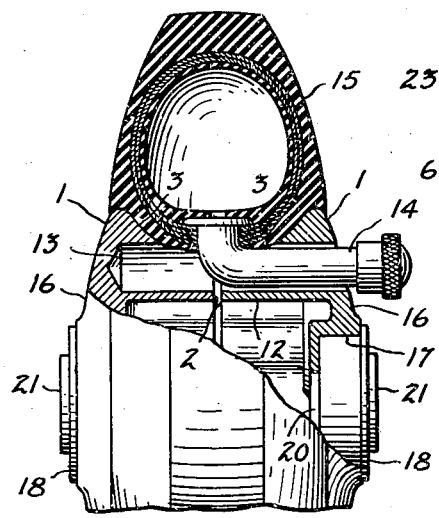
Fig. 5 is a fragmentary section similar to Fig. 1, showing a pneumatic tire mounted on the wheel body.

As shown in the accompanying drawing, the body of the wheel is composed of two identical interchangeable sections 1, which may be castings formed of a suitable aluminum alloy. Each of the wheel body halves has an annular tire seating flange 2 adjacent its periphery. The outer faces of the tire seating flanges of the two halves of the wheel body have inwardly inclined outer faces 3 which, when the two halves are secured together, provide a convex recess to receive the convex base portion 4 of a tire 5. The inner faces 6 of the tire seating flanges are substantially cylindrical, the flange of each section being provided at regularly spaced points with thickened portions or bosses 7, through which transverse bores may be formed to receive clamping bolts 8. Since the two halves of the wheel body are identical, the bolt receiving apertures may be registered to receive the bolts 8. The bolts 8 each have a head 9 and a nut 10 which are seated in recesses 11 in the outer faces of the wheel sections. By tightening the nuts 10, the two halves of the wheel body may be drawn together to apply the desired clamping pressure to the base portion 4 of the tire. At one point in its circumference each of the tire seating flanges 2 has a thickened portion 12 in which is formed an axially extending socket 13 which extends from the inner edge of the flange 2 near the exterior surface of the side wall of the wheel body. If it is desired to mount a pneumatic tire such as shown in Fig. 5 upon the wheel body, it is only necessary to drill through one side wall of the wheel body into the chamber formed by the sockets 13 to provide an opening to receive the laterally projecting valve stem 14 of a pneumatic tire 15, as shown in Fig. 5.

Each half of the wheel body has a convex outer face 16 in which there is formed a central recess 17 adapted to receive the outer race ring 18 of a ball bearing 19. Centrally of the bottom of each central recess 17 the side walls of the wheel halves are provided with axle receiving openings 20 which register with the bore of the inner race ring 21 of the ball bearing. The two cup shaped wheel body halves, when secured together, provide an interior substantially cylindrical chamber 22 which is of a diameter considerably greater than that of the axle upon which the wheel is to be placed, and this chamber provides a reservoir for grease of a capacity such that the bearings may be lubricated for the life of the wheel by packing the chamber 22 with grease.

Figures 3, 4:
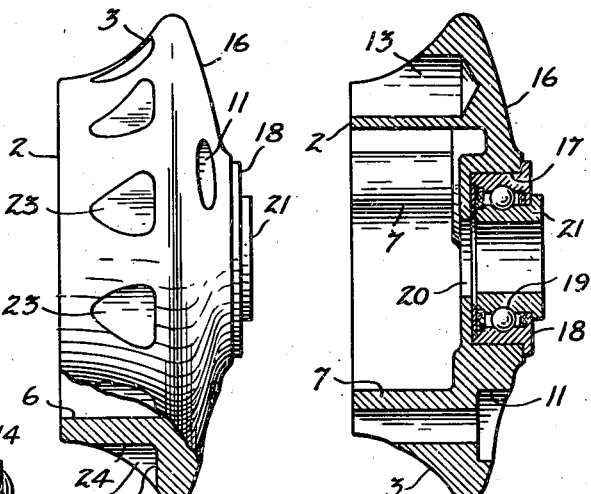
Fig. 3 is a side elevation of the wheel body section shown in Fig. 2, a portion of the periphery being broken away and shown in section.
Fig. 4 is a section taken on the line indicated at 4—4 in Fig. 2.

In order to prevent circumferential slippage between the wheel body and tire, the outer faces 3 of the tire seating flanges are provided with circumferentially spaced recesses 23 which have bottoms 24 substantially parallel with the inner faces of the flanges 2, and outer sides 25 substantially perpendicular to the axis, as shown in Fig. 3. These recesses increase in depth from their inner to their outer ends and also increase in width from their inner to their outer ends. Lateral pressure of the tire seats against the base portion 4 of a rubber cushion tire 5 will cause portions of the rubber base portion to expand into the recesses 23 and these projecting portions of the tire base will effectively lock the tire against circumferential slippage of the wheel body. In the case of a pneumatic tire the elastic inner wall of the tire will be forced by pneumatic pressure and by the lateral pressure of the tire seats into the recesses 23 to provide the same locking effect as is provided with a cushion tire.

The present invention provides a construction which is exceedingly simple and which can be manufactured at a very low cost since very few machining operations are necessary. Because of the fact that the two sections of the wheel are identical, damage to one of the sections will not necessitate the replacement of the entire wheel and any section will replace any other section, thus reducing the number of parts required for replacment. The identity of the wheel halves also reduces the cost of manufacture since only one mold is required.

It is to be understood that variations and modifications of the specific devices herein shown and described for purposes of illustration, may be made without departing from the spirit of the invention.

What I claim is:

1. An aircraft wheel comprising a wheel body consisting of two side members, each having a body portion provided with a central axle receiving opening and an inwardly projecting annular tire seating flange, each side member having bolt holes extending through its flange from the inner edge of the flange to the side face of the member, each side member having a tire seating portion on the exterior face of its flange which tapers inwardly from the periphery of the body portion of the side member to the edge of the flange thereof, said tire seating portion having circumferentially spaced recesses, a rubber tire having an interior convex base portion adapted to conform to the tapered seating faces of said side members and to enter the recesses thereof, and transverse bolts extending through said holes for securing said side members with the tire seating flanges disposed edge to edge and for compressing the base portion of the tire between the exterior seating portions of said side members.

2. An aircraft wheel comprising a wheel body consisting of two side members, each having a body portion provided with a central axle receiving opening and an inwardly projecting annular tire seating flange, each side member having a tire seating portion on the exterior face of its flange which tapers inwardly from the periphery of the body portion of the side member to the inner edge of the flange, the tapered tire seating portion of each side member having circumferentially spaced recesses therein which extend from adjacent the inner edges to near the outer edges of said seating portions and which increase in depth and width from their inner to their outer ends, a rubber tire having an elastic interior base portion adapted to conform to the seating portions of said side members, and transverse bolts extending through said flanges for securing said side members together with their flanges edge to edge and for compressing the base portion of the tire between the seating portions of the side members to force portions of the tire base into said recesses and provide a slip resisting connection between said tire and wheel body.

3. An aircraft wheel comprising a wheel body consisting of two side members, each having a body portion provided with a central axle receiving opening and an inwardly projecting annular tire seating flange, each side member having a tire seating portion on the exterior face of its flange which tapers inwardly from the periphery of the body portion of the side member to the inner edge of the flange, the flange of each of said side members having an axially disposed socket formed therein which extends from the inner edge of the flange to near the outer face of the side member, a tire having a convex base portion adapted to conform to the tapered seating portions of said side members, and means for securing said side members together with the flanges of the side members disposed edge to edge and with said sockets in registry to provide a transverse cavity adjacent the base of the tire for receiving a laterally extending valve stem.

4. An aircraft wheel comprising a wheel body composed of two substantially identical and interchangeable side members, each a casting having a body portion and an inwardly projecting annular tire seating flange, the body portion of each side member being provided with a central outwardly opening recess adapted to receive a ball bearing and having an exterior face which slants inwardly from adjacent said recess to the periphery of said body portion, each side member having a tire seating portion on the exterior face of its flange which tapers inwardly from the periphery of the body portion of the side member to the edge of the flange thereof and bolt holes extending through its flange from the inner edge of the flange to the outer face of the member, the tire seating portion of each side member having circumferentially spaced recesses, a rubber tire having a convex interior base portion adapted to conform to the tapered seating faces of said side members and enter the recesses of said seating portions, and bolts extending through said bolt holes for securing said side members together with their flanges disposed edge to edge and for clamping the base portion of said tire between the seating portions of said side members.

RAY W. BROWN.